Jan. 3, 1967 H. L. WARNER 3,296,581

SIGNAL AMPLITUDE DERIVATION FROM COINCIDENCE INFORMATION

Filed Jan. 27, 1965 2 Sheets-Sheet 1

INVENTOR.
HENRY L. WARNER
BY
Rolla N. Carter
ATTORNEYS

SIGNAL AMPLITUDE DERIVATION FROM COINCIDENCE INFORMATION

Filed Jan. 27, 1965 2 Sheets-Sheet 2

INVENTOR.
HENRY L. WARNER
BY
[signature]
ATTORNEYS

United States Patent Office 3,296,581

Patented Jan. 3, 1967

3,296,581
SIGNAL AMPLITUDE DERIVATION FROM COINCIDENCE INFORMATION

Henry L. Warner, Panama City, Fla., assignor to the United States of America as represented by the Secretary of the Navy Filed Jan. 27, 1965, Ser. No. 428,596
4 Claims. (Cl. 340—3)

The invention described herein may be manufactured and used by or for the Government of the United States of America for governmental purposes without the payment of any royalties thereon or therefor.

The present invention relates to a method and apparatus for deriving amplitude information from a desired signal in relation to a noise signal from a channel or channels in which both the desired and noise signals are fully limited, and more particularly to the recovery of amplitude information from amplitude limited channels using an observed fact that the zero crossing time of the desired signal is interfered with to various degrees depending upon its level in relation to noise.

Signal processing according to the invention is applicable to any transmission line, channel, or signal processing link that has a varying signal-to-noise input. The inventive concept makes use of the fluctuation of the time period between zero crossings in the carrier signal due to noise. The greater the signal amplitude relative to the noise amplitude, the more the signal controls the exact instant of zero crossing. More specifically, the number of coincidence counts per unit time in one or more information channels is utilized to determine the amplitude of the input signal with respect to the instantaneous noise level and provide directly an output signal level proportional to this ratio and independent of the absolute values of the signal and noise. It may be noted that amplitude recovery in accordance with the invention requires the presence of noise in the signal environment and that this requirement is met by all circuits presently known.

An object of the invention is to determine the original amplitude of an input signal after it has been fully limited.

Another and important object of the invention is to eliminate the need for variable gain amplifiers in many signal processing circuits.

Still another object of the invention is to improve phase comparison sonar systems by recovering amplitude information which, as such, is destroyed in the required processing of input signals.

The above and further objects, features and advantages of the invention will become apparent from the following description of preferred embodiments thereof when read in connection with the accompanying drawing in which.

The inventive concept is useful to detect amplitude modulations of any carrier signal in the presence of noise. One field in which the invention possesses special utility is the phase comparison sonar art where the signal processing needed to accurately determine phase destroys amplitude information in the usual sense and an additional channel by-passing the phase comparing channels is presently employed to insert amplitude information prior to any display circuit.

Figure 1:
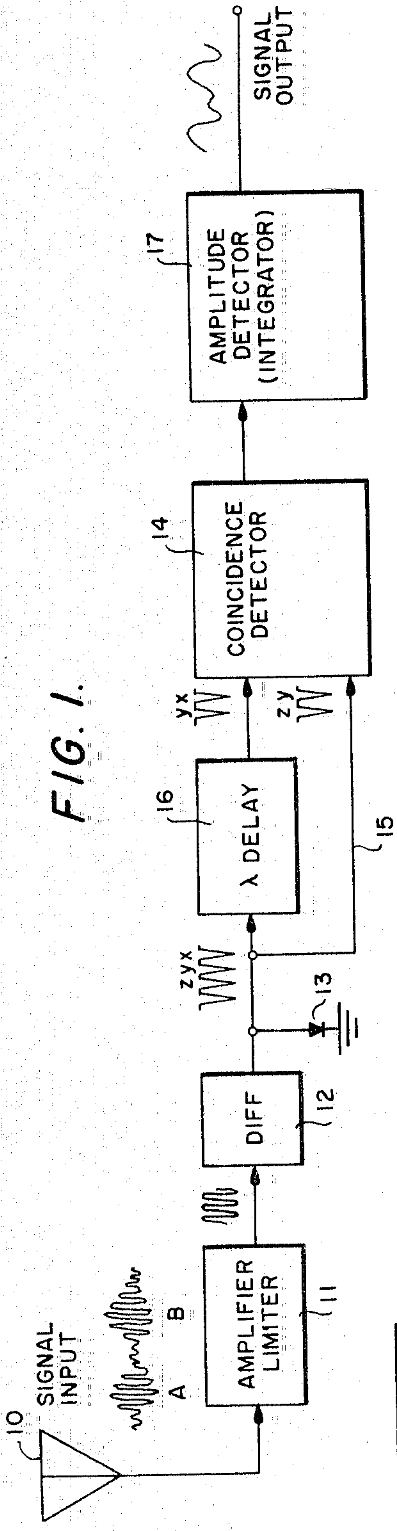
FIG. 1 is a diagram of a single channel wave processing system in accordance with the invention suitable for use in a radio receiver, for example, and including limiter, coincidence and amplitude detecting circuits.

A preferred embodiment of the invention for single channel operation, such as a radio receiver, is shown in FIG. 1 as comprising an antenna 10 for receiving a carrier wave signal which is passed through a receiver channel including an amplifier limiter 11 the rectangular wave output of which is differentiated by an R.C. circuit 12, the positive spikes are clipped by the diode circuit 13 and the remaining negative spikes are fed to a coincidence detector 14 through parallel paths one of which is a direct line 15 and the other of which includes a delay line 16 which delays a spike by precisely the time period of one wavelength ($\lambda$) of the received carrier wave. If the signal is large compared to the noise, such as at A and B in the signal input, spikes $y$ and $z$ will arrive via the line 15, at the coincidence detector 14 at the same instants as previous spikes $x$ and $y$, respectively, which were delayed by the delay line 16. The output of the coincidence detector 14 is integrated over successive short intervals by an amplitude detector 17 the signal output of which corresponds in amplitude to the signal input received by the antenna 10 for the reason that a series of consecutive large amplitude periods will cause consecutive coincidences to be integrated whereas when the carrier amplitude becomes less, noise modulates the signal period resulting in fewer coincidences per unit time and a corresponding decrease in the output of the amplitude detector 17. The receiver can be tuned to different carriers by adjusting the delay time of the delay line 16.

Figure 2:
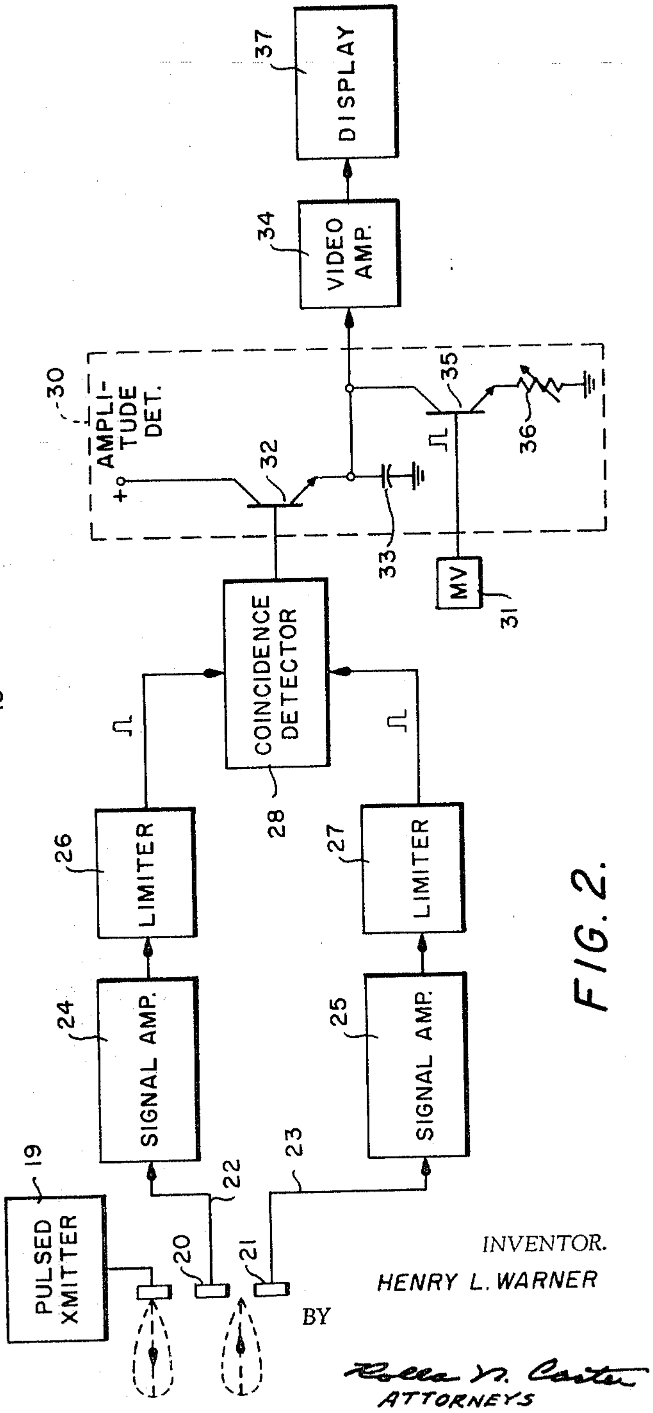
FIG. 2 shows a diagram of a phase comparison sonar system utilizing amplitude restoring circuits in accordance with the invention.
Figure 3:
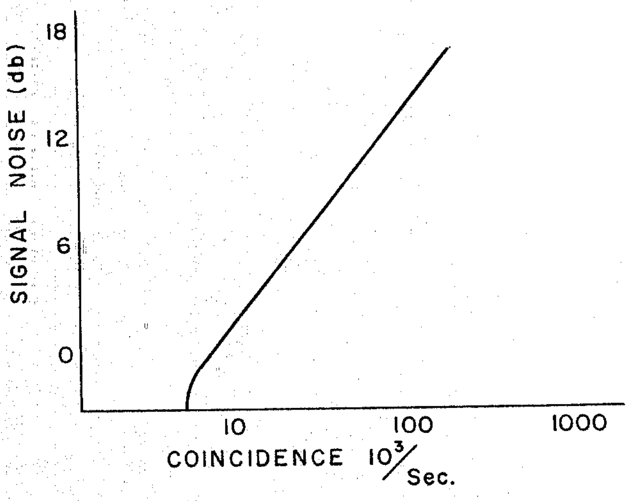
FIG. 3 is a graph showing the relation between noise level and the number of coincidence counts per unit time.

In a preferred embodiment for the catacoustic system shown in FIG. 2 an independent transmitter 19 is utilized for radiating into the water short pulses of acoustic energy with a phase comparison sonar receiver incorporating the invention always in the receiving mode. Exemplary operating parameters herein assumed are a carrier frequency of 250 kilocycles per second and a pulse length of 50 microseconds. As here shown, hydrophones 20 and 21 receive the reflected wave energy and pass the corresponding electric wave energy to receiver channels 22 and 23 which include, respectively, signal amplifiers 24 and 25 and limiters 26 and 27, the outputs of which are fed to a coincidence detector 28 which produces an output only upon coincidence of its two inputs. Such coincidence will occur only when the arriving wave front impinges very nearly parallel onto the faces of the hydrophones 20 and 21, the degree of parallelism required being dependent upon the pulse width at the output of the limiters 26 and 27 which pulse width may be chosen to be .05 microsecond. It has been found that the ratio of signal-to-noise at the input of the receiver channels 22 and 23 controls the number of coincidences per unit time detected by the coincidence circuit 28. Both the signal and the noise have identical amplitudes at the outputs of the limiters 26 and 27; however, when the input signal is large compared to the noise the coincidence count per unit time approaches the signal frequency, whereas, when the input signal decreases and becomes equal to or less than the noise the coincidence count per unit time decreases in substantially direct proportion (see FIG. 3) and approaches as a limit a count which represents the chance occurrence of two simultaneous zero crossings between two independent random noises. The difference between the noise count and the large signal count can amount to many thousands of counts per second up to the operating frequency. It is thus apparent that as the input signal varies with respect to noise, the number of coincidence counts per unit time varies and this latter variation is representative of the input signal amplitude.

Figure 4:
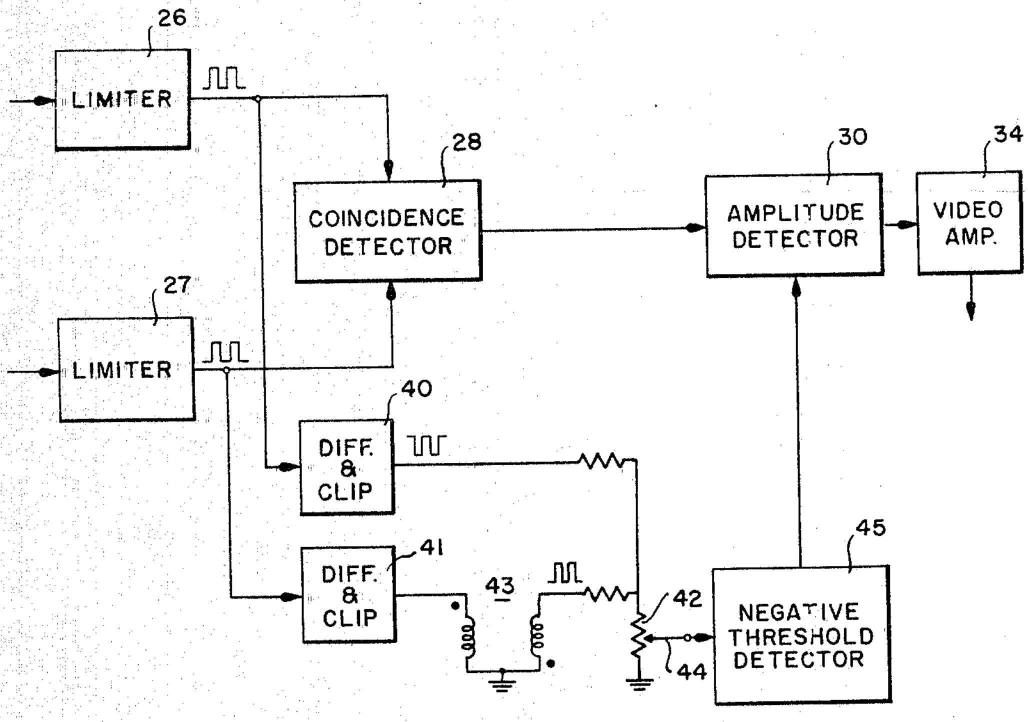
FIG. 4 is a diagram of a modification of the embodiment of the invention shown in FIG. 2.

The output pulses of the coincidence detector 28 in FIG. 2 are applied to an amplitude detector 30 which converts into amplitude information the number of pulses received per unit of time which may be a fixed arbitrary time period as determined by timing pulses from a multivibrator 31 as shown in FIG. 2 or the length of a pulse radiated by the transmitter 19, or it may be for variable periods as determined by timing pulses representing non-coincident cycles as will be described in connection with FIG. 4. Coincident pulses from the detector 28 are employed to vary by increments the charge on a capacitor and, as here shown, such pulses applied to the base of an NPN transistor 32 complete a charging circuit to bring about a corresponding build up across a capaictor 33 of a potential which provides the input for a video amplifier 34 powering a display 37. At fixed time intervals, e.g., each 50 microseconds, the multivibrator 31 applies a pulse to the base of an NPN transistor 35 to provide a discharge path for the capacitor 33 to cause a partial or even total removal of the potential built up across the capacitor 33. This discharge path preefrably includes a series connected resistance 36 adjustable to regulate the rate of discharge during each reset period to obtain an optimum display. The potential across the capacitor 33 for any charging period will depend upon the number of coincidences during such period, i.e., the pulse density, which in turn depends upon the signal-to-noise ratio in the original signal. As is well known, the same result may be obtained by utilizing the coincident pulses to remove an increment of charge from a charged capacitor and the timing pulses employed for restoring increments of charge.

As was indicated above, the counting intervals may be terminated by pulses representing non-coincident cycles and one such arrangement will now be described in connection with FIG. 4 which shows only that portion of the system of FIG. 2 necessary to illustrate the desired circuit modification. In FIG. 4 as in FIG. 2 the coincidence detector 28 has its inputs connected to the outputs of the limiters 26 and 27 and has its output connected through the amplitude detector 30 to the video amplifier 34. The anti-coincident circuit for determining the duration of the counting intervals comprises two networks 40 and 41 for differentiating the positive rectangular waveforms from the limiters 26 and 27, respectively, and clipping the positive spikes to leave as outputs the remaining negative spikes as indicated. The output from the network 40 is connected to ground through a potentiometer 42 while the output from the network 41 is inverted by a transformer 43 and then connected to ground through the potentiometer 42. A pick-off contact 44 applies a selected portion of the voltage drop across the potentiometer 42 to a negative threshold detector 45 whose output is applied to the base of the transistor 35 in the amplitude detector 30. It will be evident that when the pulses from the network 40 coincide in time with the pulses from the transformer 43 there will be no current through the potentiometer 42 and no input to the detector 45, but when a negative pulse from the network 40 has no coinciding positive pulse from the transformer 43, a negative pulse will be applied to the negative threshold detector 45 and when such a pulse has sufficient amplitude a timing pulse will be passed to the amplitude detector 30 to terminate a counting cycle.

Under practical operating conditions, especially in sonar systems, coincident pulses are relatively rare and it is generally desirable to provide that the termination of a counting cycle only partially removes the accumulated counts so as to maintain the most useful display. In using apparatus corresponding to the embodiment shown in FIG. 4 it has been found beneficial to adjust the resistance 36 so that an anti-coincident pulse varies the charge on the capacitor by an increment substantially equal in magnitude to an incremental variation in charge caused by a coincident pulse. In any event a skilled operator can while watching the display 37 adjust the resistance 36 to obtain a display which is optimum for its particular purpose. Sonar displays usually employ cathode ray tubes or some form of facsimile recorder.

When coincident pulses are plentiful as in the radio receiver of FIG. 1, timing cycles, as such, need not be utilized. Instead, the integrating (counting) capacitor may be provided with an RC charging or discharging circuit having a suitable time constant, e.g., 100 microseconds. It is thus apparent that the integrator performs continuous integration, but has a continuously failing memory for past events which means that the signal output as indicated in FIG. 1 will follow substantially the envelope of the amplitude modulated input carrier wave.

From the foregoing it is evident that the amplitude of the output signal is controlled by the density (repetition rate) of the coincident pulses as determined by the signal-to-noise ratio and therefore, although the overall level of the received signal from a given target will vary with distance, a given target will supply a signal the strength of which relative to its surroundings remains substantially constant. This relatively constant relation results from the fact that just as the signal strength from a target decreases with distance so does the noise such as bottom reflection and the like. Were it otherwise, the present invention would not function satisfactorily without some form of variable gain amplification.

It is to be understood that the invention is not restricted to the specific embodiments shown and described since these were chosen as embodiments presently preferred, and many modifications will readily suggest themselves to those skilled in the art. Other circuit arrangements may be employed for practicing the invention, the scope of which is pointed out in the appended claims.

What is claimed is:

1. A signal receiving system comprising:

a pair of transducer means for receiving amplitude modulated signal waves accompanied by noise signal waves;

a pair of receiver means respectively connected to the outputs of said pair of transducer means for amplifying and fully limiting said amplitude modulated signal waves and said noise signal waves in such manner as to effect conversion thereof into pulses having uniform width and amplitude;

means connected to the outputs of said pair of receiving means for providing a coincidence output pulse only when the pulses from said receiving means coincide in time;

detector means connected to the output of said coincidence output pulse providing means for producing a signal having a level proportional to the density of the coincidence output pulses therefrom, said means including a capacitor effectively connected to the output of said coincidence output pulse providing means for being charge varied in one sense a fixed increment by each of said coincidence output pulses, and timing means connected to said capacitor for periodically varying in another sense the charge thereon;

means connected to the outputs of said pair of receiving means for producing a timing pulse whenever the output pulses therefrom do not coincide in time; and means connected between the output of said timing pulse producing means and an input of the aforesaid detector means for varying the periodicity of the timing pulses from said timing pulse producing means in response to the ones thereof having a preselected minimum amplitude.

2. The device of claim 1 wherein said means connected between the output of said timing pulse producing means and an input of the aforesaid detector means for varying the periodicity of the timing pulses from said timing pulse producing means in response to the ones thereof having a preselected minimum amplitude is a thresholder.

3. The invention according to claim 1 further characterized by a display means effectively connected to the output of said detector means for reading out the signal therefrom in terms of the density of the aforesaid coincidence output pulses.

4. A sonar system comprising in combination:

a pair of transducer means for receiving amplitude modulated signals accompanied by noise signals from within a subaqueous medium and for producing electrical output signals proportional thereto;

a pair of receiver means respectively connected to the outputs of said pair of transducer means for amplifying and fully limiting the electrical output signals proportional to said amplitude modulated and noise signals in such manner as to effect conversion thereof into pulses having uniform width and amplitude;

coincidence detector means effectively connected to the outputs of said pair of receiving means for providing an output pulse whenever the uniform width and amplitude pulses from said receiving means coincide in time;

integrator-amplitude detector means for timely producing an output signal having a voltage level that is proportional to the density of the output pulses from said coincidence detector means, said integrator-amplitude detector means having an input connected to the output of said coincidence detector means, a timing signal input, and an output;

means connected to the outputs of said pair of receiving means for producing a timing signal whenever the uniform width and amplitude output pulses therefrom do not coincide in time; and means connected between the output of said timing signal producing means and the timing signal input of the aforesaid integrator-amplitude detector means for varying the periodicity of the timing signal supplied to said integrator-amplitude detector means in response to timing signals thereof having a predetermined minimum amplitude.

References Cited by the Examiner

UNITED STATES PATENTS

| | | | |
|---|---|---|---|
| 2,580,148 | 12/1951 | Wirkler | 325—476 X |
| 2,676,206 | 4/1954 | Bennett et al. | 179—1 |
| 2,698,896 | 1/1955 | Rinia | 325—324 X |
| 2,885,590 | 5/1959 | Fuller | 315—1 |
| 2,935,604 | 5/1960 | Di Toro | 325—324 X |
| 2,962,714 | 11/1960 | Meixell et al. | 343—114.5 |
| 2,978,673 | 4/1961 | Graham | 340—15.5 |
| 3,058,110 | 10/1962 | Burns et al. | 346—33 |
| 3,153,237 | 10/1964 | Lakatos | 343—105 |

CHESTER L. JUSTUS, *Primary Examiner.*

R. A. FARLEY, *Assistant Examiner.*